United States Patent
Saito et al.

(10) Patent No.: US 8,660,452 B2
(45) Date of Patent: Feb. 25, 2014

(54) POWER SUPPLY SYSTEM AND IMAGE FORMING APPARATUS

(75) Inventors: Seiji Saito, Mishima (JP); Tomoo Akizuki, Suntou-gun (JP); Takeshi Shinji, Mishima (JP); Keisuke Ishizumi, Mishima (JP); Jun Matsumoto, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/115,212

(22) Filed: May 25, 2011

(65) Prior Publication Data

US 2011/0293314 A1  Dec. 1, 2011

(30) Foreign Application Priority Data

May 28, 2010 (JP) .................................. 2010-123355

(51) Int. Cl.
*G03G 15/00* (2006.01)
*G03G 15/16* (2006.01)

(52) U.S. Cl.
USPC .............................................. 399/88; 399/66

(58) Field of Classification Search
USPC .................................................. 399/66, 88–90
See application file for complete search history.

(56) References Cited

U.S. PATENT DOCUMENTS

| 6,963,701 | B2 | 11/2005 | Inukai |
| 7,020,407 | B2 | 3/2006 | Nakata et al. |
| 7,558,501 | B2 * | 7/2009 | Saito et al. ............ 399/88 |
| 2004/0057740 | A1 | 3/2004 | Inukai |
| 2004/0165901 | A1 | 8/2004 | Nakata et al. |

FOREIGN PATENT DOCUMENTS

| CN | 1908823 A | 2/2007 |
| JP | 8-262882 A | 10/1996 |
| JP | 11-206113 A | 7/1999 |
| JP | 2002-237394 A | 8/2002 |
| JP | 2004-29601 A | 1/2004 |
| JP | 2004-258207 A | 9/2004 |
| JP | 2006-81233 A | 3/2006 |
| JP | 2006-204016 A | 8/2006 |
| JP | 2007-68384 A | 3/2007 |
| JP | 2010-57255 A | 3/2010 |

OTHER PUBLICATIONS

Notification of Reason for Rejection dated Sep. 27, 2011, in Japanese Application No. 2011-118169.
Chinese Office Action dated Aug. 27, 2013, in related Chinese Patent Application No. 201110139345.1 (with English translation).

* cited by examiner

*Primary Examiner* — Hoang Ngo
(74) *Attorney, Agent, or Firm* — Fitzpatrick, Cella, Harper & Scinto (57) ABSTRACT

An image forming apparatus includes an image bearing member, a transfer member, and a power supply unit that outputs a voltage to the transfer member. The power supply unit includes a first voltage generation circuit that includes a piezoelectric transformer driven at a drive frequency within a predetermined frequency area to output a first voltage having a predetermined polarity, and a second voltage generation circuit that outputs a second voltage with a polarity opposite to the predetermined polarity. In addition, a control unit controls the power supply unit to output a superposed voltage as a voltage having the predetermined polarity and corresponding to a voltage output from the piezoelectric transformer by driving the piezoelectric transformer at a driven frequency out of range of the predetermined frequency area, with the superposed voltage being a voltage in which the first voltage and the second voltage are superposed.

21 Claims, 8 Drawing Sheets

POWER SUPPLY SYSTEM AND IMAGE FORMING APPARATUS

BACKGROUND OF THE INVENTION

1. Field of the Invention

The present invention relates to a power supply system and an image forming apparatus, by means of a piexoelectric transformer-type of a power supply unit.

2. Description of the Related Art

Conventionally, in an image forming apparatus of an electrophotography system, a DC voltage is applied to a transfer member to electrostatically transfer a toner image from an image bearing member to a recording medium. For an excellent transfer, a current of about 10 μA is usually supplied to the transfer member at a high voltage (voltage greater than several hundred V which is higher than a commercial power supply voltage). Conventionally, a power supply unit uses a winding electromagnetic transformer to generate such a high voltage. However, the electromagnetic transformer is an obstacle for miniaturization and weight reduction of the power supply unit. Therefore, a piezoelectric transformer (piezoelectric ceramic transformer) is used in place of the winding electromagnetic transformer.

Therefore, the use of the piezoelectric transformer has an advantage of allowing miniaturization and weight reduction of the power supply unit. The power supply unit using the piezoelectric transformer includes a piezoelectric transformer that outputs a maximum voltage at a predetermined resonant frequency and a generation unit that generates a signal that oscillates at a drive frequency for driving the piezoelectric transformer across a predetermined frequency range including the resonant frequency.

Such a piezoelectric transformer-type power supply unit is disclosed in Japanese Patent Application Laid-Open No. H11-206113. An example of applying the apparatus to an image forming apparatus is disclosed in Japanese Patent Application Laid-Open No. 2007-068384.

However, in the case where the piezoelectric transformer-type power supply unit is used in the image forming apparatus, there are the following problems.

When the frequency of the piezoelectric transformer is controlled, secondary vibrations of high frequency components are generated if the drive frequency reaches a high frequency area, and an unstable area is generated in the output characteristics. The output voltage is unstable if the piezoelectric transformer is controlled at a drive frequency of the unstable area. More specifically, the output of a low voltage with a high drive frequency is unstable in the piezoelectric transformer-type power supply unit. Therefore, a lower limit voltage that can ensure the stable output voltage (hereinafter, referred to as "ensured lower limit voltage") is set in consideration of variations in circuit configurations of individual power supply units. In other words, the frequency that drives the piezoelectric transformer is a drive frequency that falls within a predetermined drive frequency area that does not include the frequency of the unstable area. In the power supply unit that drives the piezoelectric transformer at the frequency of the predetermined drive frequency area, a voltage between the maximum voltage and the ensured lower limit voltage is set as an capable output voltage.

Therefore, in image forming apparatuses by means of the conventional type of piezoelectric transformer-type of a power supply unit, there is a problem in which the output voltage for outputting voltage to the power-fed member in a stable condition is limited to the voltage whose magnitude ranges between the maximum voltage and the ensured lower limit voltage

SUMMARY OF THE INVENTION

Therefore, a purpose of the present invention is to provide an image forming apparatus that is capable of outputting a voltage at a level that cannot be output by driving a piezoelectric transformer at a drive frequency in a predetermined drive frequency area, without narrowing down the voltage area output by a piezoelectric transformer-type power supply unit.

Another purpose of the present invention is to provide a power supply system that is capable of outputting a voltage at a level that cannot be output by driving a piezoelectric transformer at a drive frequency in predetermined drive frequency area, without narrowing down the voltage area output by a piezoelectric transformer-type power supply unit.

A further purpose of the present invention is to provide an image forming apparatus, including an image bearing member that bears a toner image, a transfer member that transfers the toner image on the image bearing member to a recording medium, a power supply unit that outputs a voltage to the transfer member, the power supply unit including a first voltage generation circuit that includes a first piezoelectric transformer driven at a drive frequency in a first drive frequency area and that outputs a voltage and a second voltage generation circuit that includes a second piezoelectric transformer driven at a drive frequency in a second drive frequency area and that outputs a voltage with a polarity opposite the voltage output by the first voltage generation circuit, and a control unit that controls the power supply unit, wherein in the case where a voltage whose magnitude cannot be output by the first voltage generation circuit is output from the power supply unit to the transfer member in spite of driving the first piezoelectric transformer at the drive frequency in the first drive frequency area, the control unit controls the power supply unit to output the voltage to the transfer member by superposing a voltage output from the first voltage generation circuit by driving the first piezoelectric transformer at a frequency in the first drive frequency area with a voltage output from the second voltage generation circuit by driving the second piezoelectric transformer at a frequency in the second drive frequency area.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, an image forming apparatus according to the present invention will be further described in detail with reference to the drawings.

First Embodiment

Figure 1:
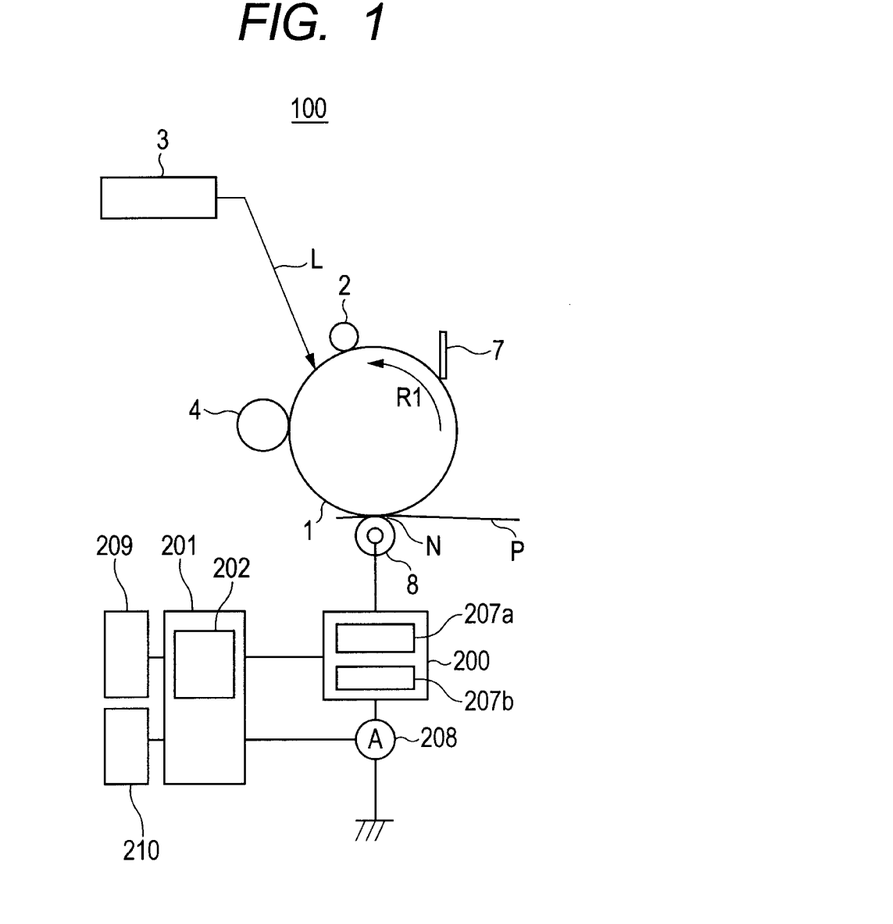
FIG. 1 is a schematic diagram illustrating a schematic configuration of main parts of an image forming apparatus according to an embodiment of the present invention.

An entire configuration and an operation of the image forming apparatus according to an embodiment of the present invention will be described. FIG. 1 schematically illustrates a configuration of main parts of an image forming apparatus 100 of the present embodiment. The image forming apparatus 100 of the present embodiment is a laser beam printer using an electrophotography system.

The image forming apparatus 100 includes a photosensitive drum 1 as an image bearing member, which is a drum-type electrophotographic photoreceptor (photosensitive member). A drive motor (not illustrated) as a drive unit drives the photosensitive drum 1 in an illustrated arrow R1 direction (counterclockwise). A charging roller 2 as a charging unit device uniformly charges the surface of the rotating photosensitive drum 1. In this embodiment, the surface on the photosensitive drum 1 is charged in a negative polarity. A laser scanner 3 as an exposure unit directs laser light L according to image information onto the surface of the charged photosensitive drum 1. As a result, an electrostatic latent image (electrostatic image) according to the image information is formed on the photosensitive drum 1. A developing device 4 uses a toner as a developer to develop an electrostatic latent image formed on the photosensitive drum 1 as a toner image. The normal polarity of the toner of the present embodiment is a negative polarity.

In this embodiment, although the electrostatic latent image is developed in a reversal state by the charge device 2 with toner charged in the same polarity as the charge polarity of the photosensitive member, the present invention can be applied to the electrophotographic apparatuses in which the electrostatic latent image charged in the polarity opposite to the charge polarity of the photosensitive member is developed in a regular state.

In the rotation direction of the photosensitive drum 1, a transfer roller 8 as a transfer member for transferring the toner image from the photosensitive drum 1 to a recording material P as a recording medium is downstream of the development position of the electrostatic latent image formed by the developing unit 4. The recording material P may be called, for example, a recording medium, paper, sheets, a transfer material, transfer paper, or recording paper. The transfer roller 8 and the photosensitive drum 1 form a transfer nip portion (abutment area) N. A recording material supply roller (not illustrated) supplies the recording material P from an accommodation section (not illustrated) that accommodates the recording material to the transfer nip portion N formed by the photosensitive drum 1 and the transfer roller 8 at a predetermined timing. A transfer voltage of a predetermined polarity (polarity opposite the normal polarity of the toner in the present embodiment) is applied to the transfer roller 8 according to the timing. The transfer voltage of the present embodiment is a voltage of a positive polarity. The effect of an electric field formed between the photosensitive drum 1 and the transfer roller 8 by the transfer voltage transfers the toner image from the photosensitive drum 1 to the recording material P supplied to the transfer nip portion N.

The recording material P is then conveyed to a fuser (not illustrated) as a fixing unit and is heated and pressurized. As a result, the toner image is fixed on the surface. The recording material P is then discharged outside the main body of the image forming apparatus.

A cleaning blade 7 as a cleaning unit removes and collects, from the photosensitive drum 1, the toner (transfer residual toner) remained on the photosensitive drum 1 without being transferred to the recording material P in the transfer nip portion N.

The transfer roller 8 as a transfer member will be further described. A foam roller including a foam elastic member can be used as the transfer roller 8. An NBR rubber, which is a relatively inexpensive rubber material, can be used as a material of the foam elastic member. An appropriate conductivity is provided to the transfer roller 8. Examples of the method of providing the conductivity generally include the following methods. A first method (electronic conductive system) is a method of combining a conductivity filler, such as a metal oxide powder and carbon black, with a polymer. A second example (ion conductive system) is a method of using an ion-conductive polymer composition, such as urethane, an NBR rubber, and an epichlorohydrin rubber. The ion conduction system can easily control the electric resistance with respect to a change in the applied voltage and is often used in recent years.

In the present embodiment, a so-called ion conductive system foam roller is used, the roller forming a foam elastic layer made of an NBR rubber around a metal cored bar. The volume resistivity of the transfer roller 8 of the present embodiment is adjusted to about $10^7$ $\Omega\cdot m$, and the rubber hardness is 30 degrees (Asker C hardness meter). In the present embodiment, the transfer roller 8 is pressed against the photosensitive drum 1 at about 9.8 N total pressure, and the transfer roller 8 rotates in association with the rotation of the photosensitive drum 1. In the present embodiment, a voltage can be applied to the transfer roller 8 from a power supply unit 200 which will be described in detail later. The transfer roller 8 is a power-fed member to which a voltage of a predetermined polarity is output from the power supply unit 200.

When a toner image charged in a negative polarity is transferred from the photosensitive drum 1 and the recording material P (hereinafter referred to as 'transfer period'), a voltage in a positive polarity is output to the transfer roller 8 from the power supply unit 200. Also, the power supply unit 200 is capable of outputting a voltage in a negative polarity to the transfer roller 8. The voltage in a negative polarity is used for transferring toner adhered on the transfer roller 8 to the photosensitive drum 1 (reverse transfer). The reverse transfer is performed by outputting the voltage in a negative polarity to the transfer roller 8 from the power supply unit 200 in timing except the transfer period.

The power supply unit includes a circuit that controls a piezoelectric transformer to output a predetermined voltage. A basic circuit configuration using the piezoelectric transformer will be described with reference to FIG. 2.

Figure 3:
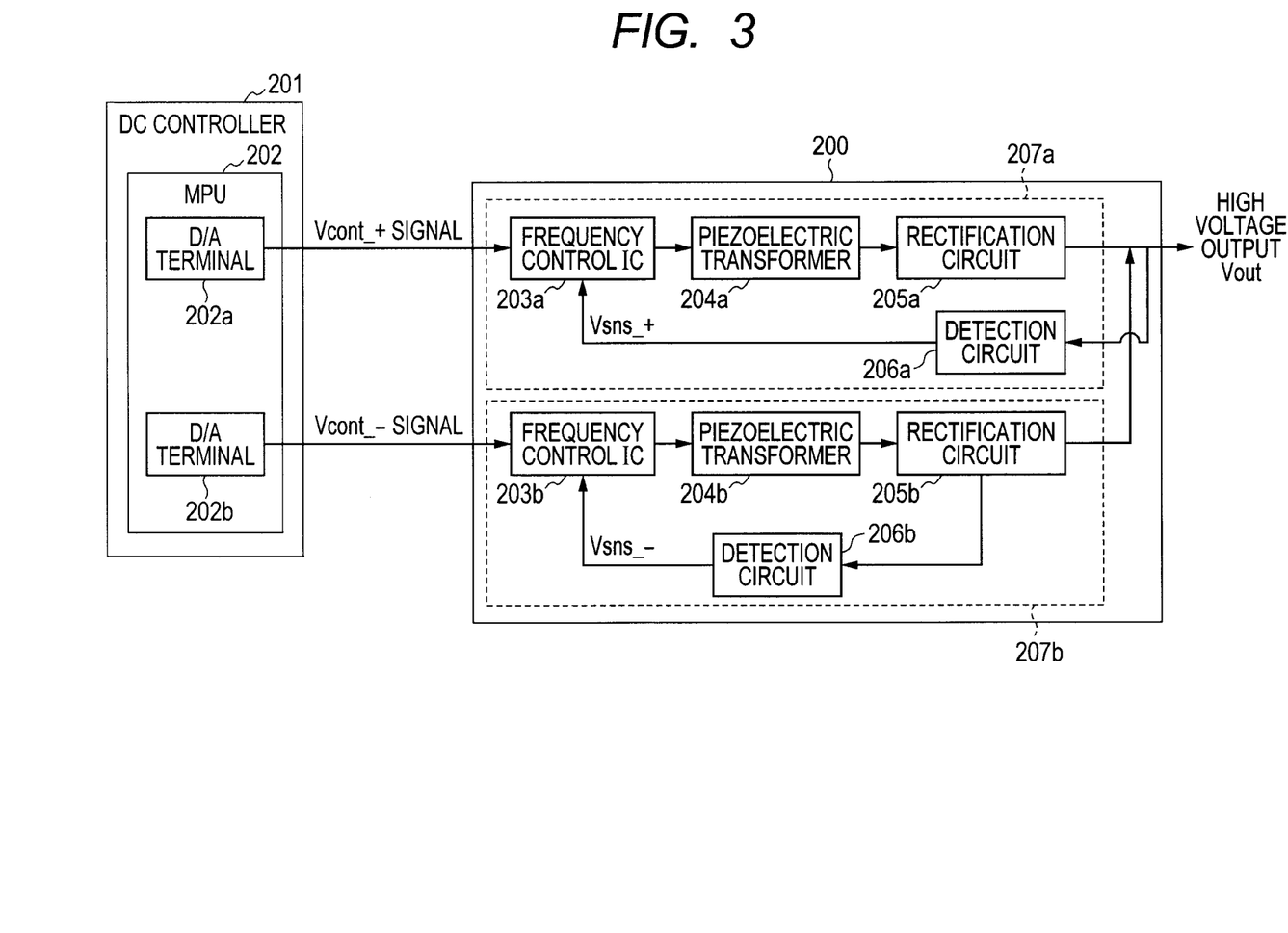
FIG. 3 is a block diagram describing a control unit and a power supply unit according to an embodiment of the present invention.

With reference to FIG. 3, a positive voltage generation circuit 207a as a circuit that outputs a positive voltage is explained. The positive voltage generation circuit 207a includes at least frequency control IC 203a, piezoelectric transformer 204a and rectification circuit 205a detection circuit 206a.

A rectification smoothing circuit 205a rectifies and smoothes the output of the piezoelectric transformer 204 to a positive voltage. The rectification smoothing circuit 205a includes diodes 102 and 103 and a capacitor 104 in FIG. 2. The output voltage of the piezoelectric transformer 204 is output from an output terminal 117 connected to a path extending from the piezoelectric transformer 204 and is supplied to the power-fed member. The output voltage is divided by resistances 105, 106, and 107 and is input to a non-inverting input terminal (plus terminal) of an operational amplifier 109 through a capacitor 115 and a protective resistance 108. Meanwhile, an analog signal (control signal (Vcont) of the power supply unit) input from an input terminal 118 is input to an inverting input terminal (minus terminal) of the operational amplifier 109 through a resistance 114. The operational amplifier 109, the resistance 114, and a capacitor 113 function as integration circuits. More specifically, the control signal Vcont smoothed according to a constant during the integration determined by a component constant of the resistance 114 and the capacitor 113 is input to the operational amplifier 109. An output end of the operational amplifier 109 is connected to a voltage control oscillator (VCO) 110. The voltage control oscillator 110 is an example of an oscillator that variably sets the frequency of the output signal according to the input control signal.

Figure 2:
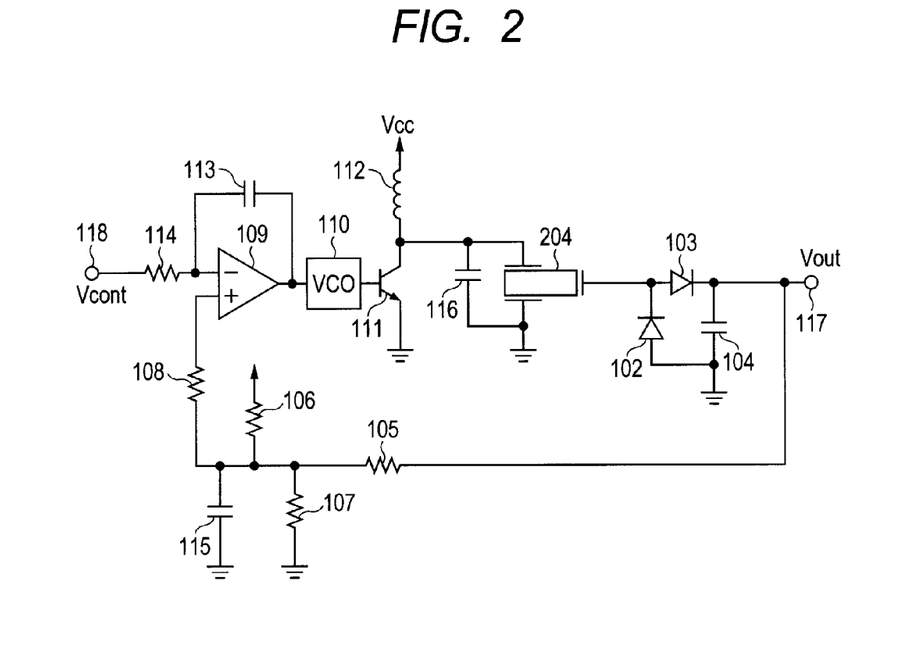
FIG. 2 is a circuit diagram of a voltage generation circuit including a piezoelectric transformer.

An output end of the voltage control oscillator 110 is connected to a gate of a field-effect transistor 111. The field-effect transistor 111 is an example of a switching element driven by an output signal of the oscillator. A drain of the field-effect transistor 111 is connected to a power supply (+24 V: Vcc) through an inductor 112 and is grounded through a capacitor 116. The inductor 112 is an element connected between the switching element and the power supply and is an example of an element including inductance components to which the voltage is intermittently applied by the drive of the switching element. The drain is further connected to one end of a primary electrode of the piezoelectric transformer 204. The other end of the primary electrode of the piezoelectric transformer 204 is grounded. A source of the field-effect transistor 111 is also grounded.

The voltage control oscillator 110 switches the field-effect transistor 111 at a frequency according to the output voltage of the operational amplifier 109. The inductor 112 and the capacitor 116 form a resonant circuit. The voltage amplified by the resonant circuit is supplied to the primary side of the piezoelectric transformer 204. The operational amplifier 109, the resistance 114, the capacitor 113, and the voltage control oscillator (VCO) 110 form a frequency control circuit that controls the frequency of the piezoelectric transformer 204 by converting the control signal.

The piezoelectric transformer 204 outputs the voltage whose value corresponds to the frequency of the drive voltage signal applied to the primary electrode. The piezoelectric transformer 204 outputs the maximum voltage when the signal having oscillation with a predetermined resonant frequency is applied.

The voltage control oscillator 110 performs an operation of increasing the output frequency when the input voltage is raised and reducing the output frequency when the input voltage is reduced. If the output voltage increases under the conditions, an input voltage Vsns of the non-inverting input terminal (plus terminal) of the operational amplifier 109 also increases through the resistance 105, and the voltage of the output terminal of the operational amplifier 109 also increases. Therefore, since the input voltage of the voltage control oscillator 110 increases, the drive frequency of the piezoelectric transformer 204 also increases. In a frequency area higher than the resonant frequency, the piezoelectric transformer 204 reduces the output voltage when the drive frequency increases. Therefore, the circuit illustrated in FIG. 2 is an example of a feedback control mechanism for maintaining the voltage output from the piezoelectric transformer 204.

When the output voltage decreases, the input voltage Vsns of the operational amplifier 109 also decreases, and the output terminal voltage of the operational amplifier 109 also decreases. Therefore, the output frequency of the voltage control oscillator 110 also decreases, and feedback control for increasing the output voltage of the piezoelectric transformer 204 is executed.

In this way, the output voltage is subjected to constant-voltage control so that the voltage becomes equal to the voltage determined by the voltage (hereinafter, described as "output control value") of the output control signal (Vcont) input to the inverting input terminal (minus terminal) of the operational amplifier 109.

As the circuit outputting a positive voltage is explained with reference to FIG. 2, the circuit outputting a negative voltage can be configured as the same circuit as the circuit outputting a positive voltage except the rectification circuit. The negative voltage generation circuit 207b includes the frequency control IC 203b, the piezoelectric transformer 204b, the rectification circuit 205b, and the detection circuit 206b and so on. The frequency control IC 203b, the piezoelectric transformer 204b and the detection circuit 206b are similar circuits to the frequency control IC 203a, the piezoelectric transformer 204a and the detection circuit 206a in FIG. 3.

A controller 201 as a control unit controls the application of the voltage to the transfer roller 8 by the power supply unit 200. In the present embodiment, an ammeter 208 as a current detection unit, which detects the current flowing through the transfer roller 8 by applying the voltage from the power supply unit 200 to the transfer roller 8, is connected to the power supply unit 200. More specifically, as described later, the controller 201 controls the application of the voltage to the transfer roller 8 by the power supply unit 200 based on a signal according to the detection result input from the ammeter 208. In the present embodiment, the controller 201 comprehensively controls the power supply unit 200 as well as the components of the image forming apparatus 100. The controller 201 controls the components of the image forming apparatus 100 including the power supply unit 200 according to programs and data stored in a ROM 209 and a RAM 210 as storage units.

A configuration of the power supply unit 200 that outputs a positive voltage and a negative voltage to the transfer roller 8 will be described based on a block diagram of FIG. 3. The power supply unit 200 includes at least a positive voltage generation circuit 207a and a negative voltage generation circuit 207b.

The power supply unit 200 is operable by the controller 201 in the first control mode in which an only positive voltage formed by the positive voltage generation circuit 207a is output, the second control mode in which the positive voltage formed by superposing a negative voltage generated by the negative voltage generation circuit 207b is output and the third control mode in which an only negative voltage formed by the negative voltage generation circuit 207b is output.

An operation when the power supply unit 200 outputs a positive voltage will be described. A setting signal Vcont_+ is output from a D/A port 202a (positive voltage signal output unit) of an MPU (microcomputer) 202 included in the controller 201 as a control unit and is input to a frequency control IC 203a. The MPU (microcomputer) 202 is a voltage setting signal output unit in the controller that can output a setting signal. The frequency control IC 203a converts the setting signal Vcont_+ into a drive frequency. A piezoelectric transformer 204a is operated based on the frequency, and a voltage is output according to the frequency characteristics and the pressure rising rate of the piezoelectric transformer 204a. The output of the piezoelectric transformer 204a is rectified and smoothed into a positive voltage by a rectification circuit 205a and is supplied to a power-fed member (the transfer roller 8 here) from the high voltage output Vout. Meanwhile, the voltage after the rectification is fed back to the frequency control IC 203a through a detection circuit 206a, and the output of the frequency control IC 203a is controlled so that an input voltage Vsns_+ from the rectification circuit 206a and the voltage set by the setting signal Vcont_+ become equipotential. The frequency control IC 203a, the piezoelectric transformer 204a, the rectification circuit 205a, and the detection circuit 206a form the positive voltage generation circuit 207a that outputs a positive voltage.

An operation when the power supply unit 200 outputs negative voltage will be described. The operation of outputting the negative voltage is similar to the operation of outputting the positive voltage. An setting signal Vcont_- of a negative polarity is output from a D/A port 202b (negative voltage signal output unit) of the MPU (microcomputer) 202 included in the controller 201 and is input to a frequency control IC 203b. The frequency control IC 203b converts the setting signal Vcont_- into a frequency. A piezoelectric transformer 204b operates based on the frequency and outputs a voltage according to the frequency characteristic and the pressure rising rate of the piezoelectric transformer 204b. The output of the piezoelectric transformer 204b is then rectified and smoothed into a negative voltage by a rectification circuit 205b, and the high voltage output Vout is supplied to the power-fed member (the transfer roller 8 in the present embodiment). Meanwhile, the voltage after the rectification is fed back to the frequency control IC 203b through a detection circuit 206b, and the output of the frequency control IC 203b is controlled so that an input voltage Vsns_- from the rectification circuit 206b and the voltage set by the setting signal Vcont_- become equipotential. The frequency control IC 203b, the piezoelectric transformer 204b, the rectification circuit 205b, and the detection circuit 206b form the negative voltage generation circuit 207b that outputs a negative voltage.

Figure 4:
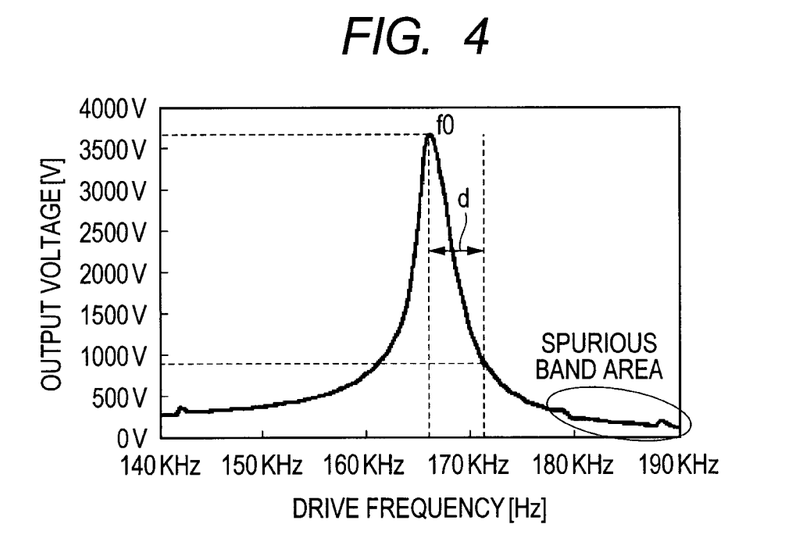
FIG. 4 is a graphic view illustrating an example of an output characteristic relative to a drive frequency of the piezoelectric transformer.

FIG. 4 illustrates an output characteristic relative to the frequency of the piezoelectric transformer of the present embodiment. In FIG. 4, an alternate current output voltage of the piezoelectric transformer is converted to the direct current voltage by the rectification circuit. More specifically, the characteristic shows a shape spreading toward the bottom in which the output voltage is the maximum at a resonant frequency f0 as illustrated in the graph of FIG. 4. Therefore, the variable control of the output voltage is possible by changing the drive frequency. For example, the output of the piezoelectric transformer can be reduced by changing the drive frequency from the resonant frequency f0 to a frequency higher than the resonant frequency f0.

However, unnecessary resonant frequencies (resonant frequencies other than f0) are generated due to the structures of the piezoelectric transformers 204a and 204b and the input voltage waveform. An area where the unnecessary resonant frequencies are generated will be called a spurious area. As illustrated in FIG. 4, the spurious band area is easily generated at frequency areas much higher and lower than the resonant frequency f0. If the piezoelectric transformer is controlled at a frequency of the spurious band area, the voltage output from the piezoelectric transformer becomes unstable. As a result, a high-quality image may not be obtained.

In the present embodiment, the output characteristic relative to the frequency of the piezoelectric transformer and the variations in the circuit configurations of the voltage generation circuits are taken into account, and the piezoelectric transformer is driven at a drive frequency that falls within a predetermined drive frequency area that does not include frequencies of the spurious band area. A predetermined drive frequency area is depicted by "d" in FIG. 4. More specifically, the positive voltage generation circuit 207a is a circuit that drives the piezoelectric transformer at a drive frequency that falls within a first drive frequency area, and the voltage that is between the maximum output voltage set by the resonant frequency f0 and the ensured lower limit voltage is capable output. In particular, the piezoelectric transformer is driven between the resonant frequency f0 and 175 (kHz). In the positive voltage generation circuit 207a, because the ensured lower limit voltage Vmin is set at 700 (V) and the positive voltage generation circuit 207a can output a voltage between 700 (V) and 3600 (V).

The negative voltage generation circuit 207b outputs −1000 (V) by driving the piezoelectric transformer at 170 (kHz) as the predetermined drive frequency. In similar to the positive voltage generation circuit 207a, in the negative voltage generation circuit 207b, the capable output voltage may be set as the negative voltage between the ensured limit voltage and the maximum voltage set by the resonant frequency f0 by driving the piezoelectric transformer at the drive frequency that is within the second drive frequency.

A method of controlling the voltage applied to the transfer roller 8 will be described.

Pre-operation control will be described first. The pre-operation control is defined as the control to determine the transfer voltage output from the power supply unit 200 to the transfer roller 8 during a toner image is transferred onto the recording medium. In the pre-operation control, the photosensitive drum 1 is rotated and driven prior to the image formation, and the transfer voltage is determined at the timing of pre-operations of the components of the image forming apparatus 100 for the image formation operation. The pre-operation control allows detecting schematic electric resistance of the photosensitive drum 1 and the transfer roller 8. The controller 201 controls the pre-operation control.

Figure 5:
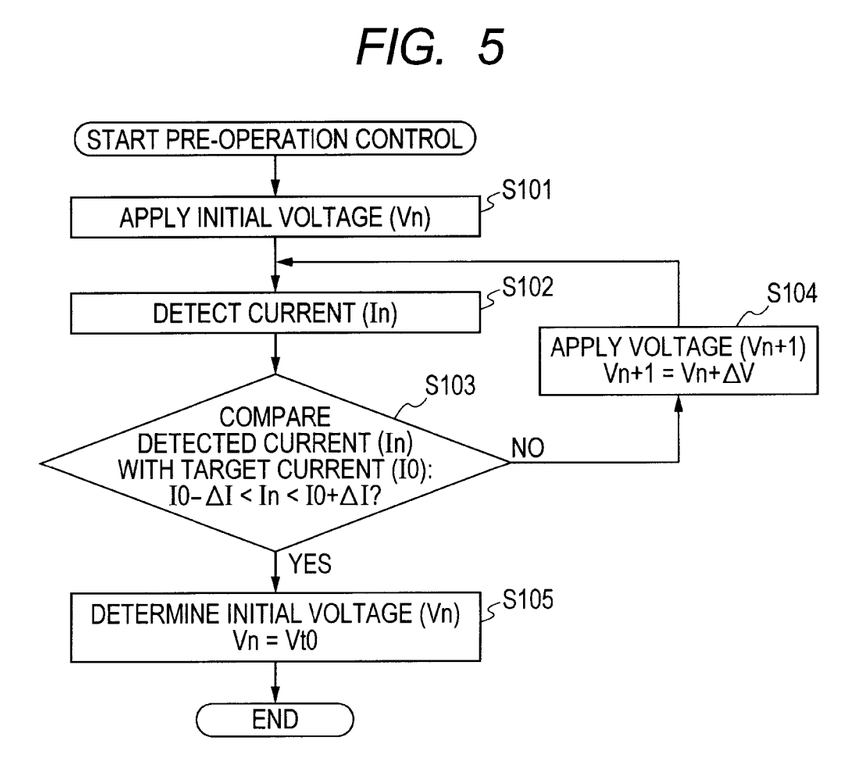
FIG. 5 is a flowchart illustrating a flow of pre-operation control for controlling a voltage applied to a transfer roller according to an embodiment of the present invention.

FIG. 5 is a flowchart of the pre-operation control. First, the MPU 202 of the controller 201 makes the transfer roller 8 output an initial voltage Vn from the positive voltage generation circuit 207a (S101). The initial voltage Vn is defined as the voltage that is stored in the ROM 209 and output from the power supply unit 200 to detect the resistance value of a member regarding the transfer in the pre-operation control. Also, the initial voltage Vn may be set as a voltage with a fixed value or a variable value according to the circumstance of the apparatus or printed sheet numbers. The MPU 202 outputs the control signal V_cont+ according to the initial voltage Vn, to the positive voltage generation circuit 207a. The MPU 202 detects, by the ammeter 208, the current flowing through the transfer roller 8 as a result of the application of the initial voltage Vn (S102). The MPU 202 compares a detection result in of the ammeter 208 with a target current I0 stored in the ROM 209 (S103). In the present embodiment, the target current I0 is 15 µA. If the MPU 202 determines that the detection result In of the ammeter 208 is not within a predetermined range relative to the target current I0, the MPU 202 applies a voltage Vn+1, which is a sum of the current initial voltage Vn and a predetermined amount of voltage ΔV, from the power supply unit 200 to the transfer roller 8 (S104). The MPU 202 records the voltage Vn+1 in which the predetermined amount of the voltage ΔV is added into the initial voltage Vn, to the RAM 210 as the renewed initial voltage Vn. The MPU 202 repeats the operation of steps 102 to 104 until the detection result In of the ammeter 208 is within the predetermined range relative to the target current I0. If the MPU 202 determines that the detection result In of the ammeter 208 is within the predetermined range relative to the target current I0, the MPU 202 determines that the initial voltage Vn at that point as a reference voltage Vt0 and records the reference voltage Vt0 in the RAM 210 as a storage unit (S105).

Transfer control will now be described. The transfer control is performed during image formation in which an image is formed and output to the recording material P. In the transfer control, the transfer voltage (print voltage) applied from the power supply unit 200 to the transfer roller 8 to transfer the toner image from the photosensitive drum 1 to the recording material P is controlled, and the controller 201 controls the transfer control.

A summary of print control will be described. In the print control, the MPU 202 of the controller 201 converts the reference voltage Vt0 obtained by the pre-operation control into a transfer voltage Vt1 applied from the power supply unit 200 to the transfer roller 8 at a timing when the tip of the recording material P reaches the transfer nip portion N. The MPU 2.02 uses a conversion table stored in the ROM 209 to convert the voltage into the transfer voltage Vt1. The MPU 202 applies the obtained transfer voltage Vt1 from the power supply unit 200 to the transfer roller 8 at substantially the same time as the conveyance of the recording material P to the transfer nip portion N to transfer the toner on the photosensitive drum 1 to the recording material P.

The reference voltage Vt0 obtained in the pre-operation control is a voltage value obtained relative to the target current I0. Therefore, the size of the value of the reference voltage Vt0 (or the size of the current value In detected by the ammeter 208) can be assumed as the size of the value of the load relative to the power supply unit 200 in the system of the photosensitive drum 1 and the transfer roller 8. In other words, the size of the value of the reference voltage Vt0 (or the size of the current value In detected by the ammeter 208) can be assumed as the size of the electric resistance value of the transfer roller 8.

Figure 6:
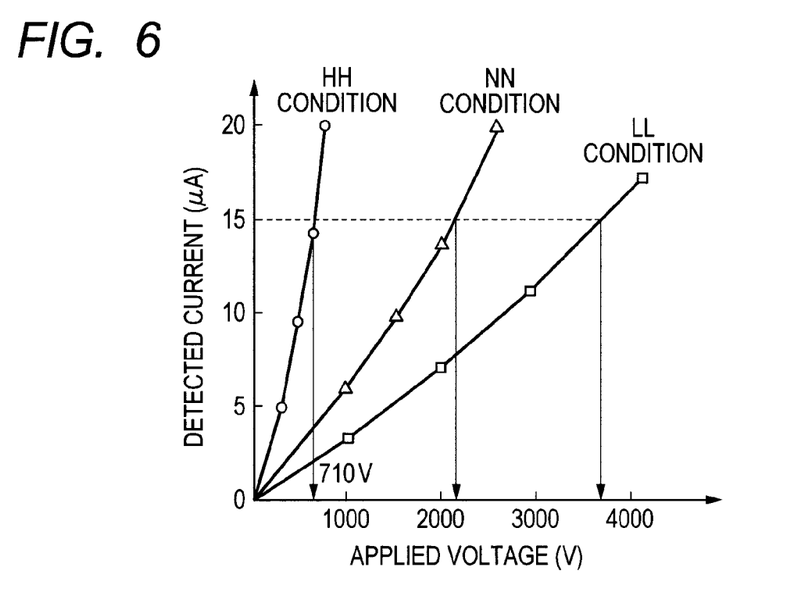
FIG. 6 is a graphic view illustrating an example of a high voltage load characteristic of the transfer roller.

Since the transfer roller 8 of the present embodiment is an ion conductive system roller, the change in the electric resistance with respect to the change in the condition is relatively large. FIG. 6 illustrates high voltage load characteristics (characteristics of the current value detected relative to the applied voltage value) under each condition of the transfer roller 8 of the present embodiment. FIG. 6 illustrates a graph of an H/H condition (30° C./80% Rh), an N/N condition (23° C./50% Rh), and an L/L condition (15° C./10% Rh).

The print control when the image formation operation is performed in the H/H condition (30° C./80% Rh) will be further described in detail. The electric resistance value of the transfer roller 8 is small under the H/H condition (30° C./80% Rh), and a low voltage needs to be output from the power supply unit 200.

When a print signal is transmitted to the MPU 202 of the DC controller 201, the MPU 202 starts the pre-operation control. In the pre-operation control, the MPU 202 determines, as the reference voltage Vt0, the voltage Vn when the detection result In of the ammeter 208 is settled within the predetermined range relative to the target current I0. Since the target current I0 is 15 µA, it is calculated Vt0=710 V under the H/H condition.

Figure 7:
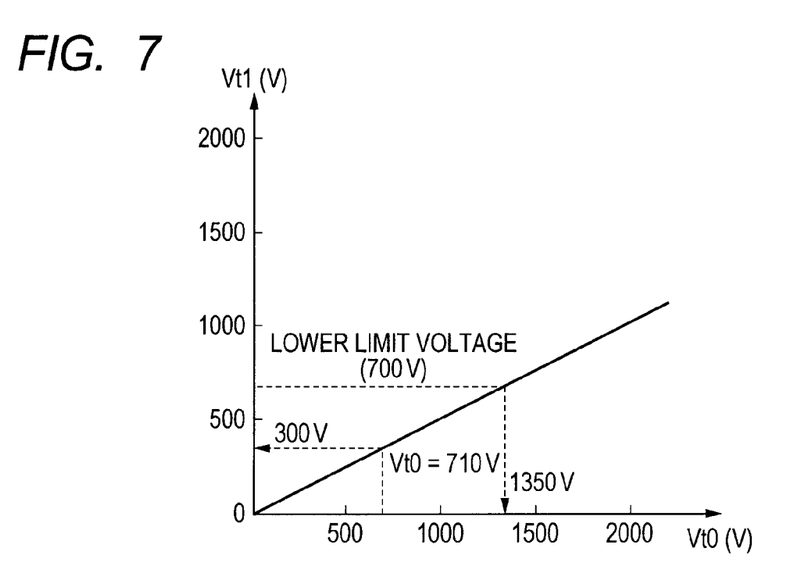
FIG. 7 is a graphic view illustrating an example of a table for determining a transfer voltage.
Figure 8:
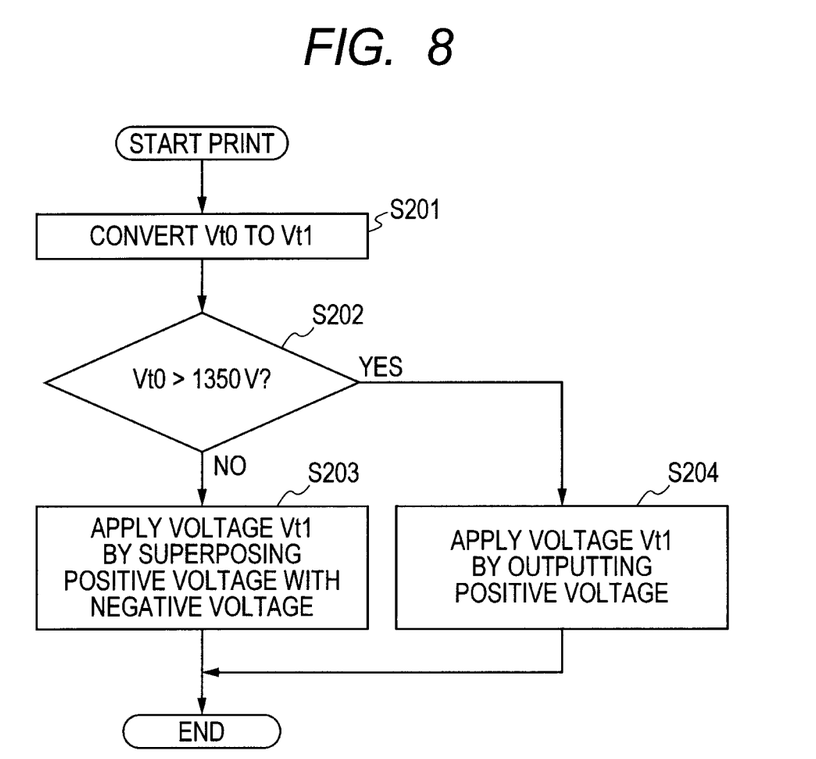
FIG. 8 is a flowchart illustrating a flow of print control for controlling the voltage applied to the transfer roller according to an embodiment of the present invention.

The MPU 202 starts the print control. FIG. 8 is a flowchart of the print control. The MPU 202 first converts the reference voltage Vt0 into the transfer voltage Vt1 (S201). More specifically, a conversion table including, as an equation, the graph illustrating the relationship between Vt0 and Vt1 as illustrated in FIG. 7 is stored in the ROM 209 in the present embodiment. The MPU 202 uses the conversion table to calculate the transfer voltage Vt1 from the reference voltage Vt0. It is calculated here Vt1=300 V. However, the transfer voltage Vt1=300 V is below the ensured lower limit voltage Vmin=700 V of the power supply unit 200.

It can be recognized from the graph of FIG. 7 that the value of the reference voltage Vt0 when the transfer voltage Vt1 is the ensured lower limit voltage Vmin=700 V is 1350 V. More specifically, if the value of the reference voltage Vt0 obtained in the pre-operation control is equal to or below 1350 V, the transfer voltage Vt1 is below the ensured lower limit voltage Vmin.

Thus, as illustrated in FIG. 8, the MPU 202 determines whether the reference voltage Vt0 is greater than 1350 (V) (S202). If the MPU 202 determines that Vt0 is equal to or less than 1350 (V), the MPU 202 superposes the output of the negative voltage generation circuit 207b with the output of the positive voltage generation circuit 207a and applies the transfer voltage Vt1 to the transfer roller (S203). That is, in the case where Vt0 is equal to or less than 1350 (V), the MPU 202 operates the power supply unit 200 in the second control mode.

More specifically, the MPU 202 sets the setting signal Vcont_+ of a positive voltage to 300 V and sets the output setting signal Vcont_- of a negative voltage to −1000 V. As a result, to output the transfer voltage Vt1=300 V from the power supply unit 200, the positive voltage output from the positive voltage generation circuit 207a can be set to 1300 V which is a value greater than the ensured lower limit voltage Vmin=700 V. Therefore, the power supply unit 200 can set the voltage below the ensured lower limit voltage as the transfer voltage and supply the voltage to the transfer roller 8.

The control of the power supply unit 200 by the controller will be further described. As for the negative voltage, the voltage after the rectification by the rectification circuit 205b is fed back to the frequency control IC 203b through the detection circuit 206b. The output of the frequency control IC 203b is controlled so that the output signal Vsns_- and the setting signal Vcont_- (−1000 V here) become equipotential. On the other hand, as for the positive voltage, the voltage after the rectification by the rectification circuit 205a is controlled on the high voltage output side of the detection circuit 206b of the negative voltage. Therefore, the voltage value after the superposition of the positive voltage with the negative voltage is controlled to be 300 V. More specifically, the voltage after the rectification is superposed with the negative voltage and fed back to the frequency control IC 203a through the detection circuit 206a. The output of the frequency control IC 203a is controlled so that the output signal Vsns_+ and the setting signal Vcont_+ (300 V here) become equipotential. At this point, the voltage after the rectification actually output from the piezoelectric transformer indicates 1300 V.

According to the present embodiment, if it is determined that the target transfer voltage Vt1 is equal to or smaller than the ensured lower limit voltage Vmin of the piezoelectric transformer, a positive voltage greater than the ensured lower limit voltage Vmin is superposed with negative voltage to control the output voltage of the power supply unit 200 to the target transfer voltage Vt1. As a result, a stable voltage of a positive polarity can be supplied from the power supply unit 200 to the transfer roller 8.

As described above, in this embodiment, in the case where it is determined that the transfer voltage Vt1 as a target is equal to or less than the ensured limit voltage Vmin of the piezoelectric transformer, the output voltage of the power supply unit 200 is controlled at the transfer voltage Vt1 as the target by overlapping a positive voltage more than the ensured limit voltage Vmin with a negative voltage.

In this embodiment, the voltage output from the negative voltage generation circuit 207b is assumed by −1000 (V) as a voltage whose absolute value is more than the ensured limit voltage Vmin of the positive voltage generation circuit 207a. This is to stabilize the output of the positive voltage generation circuit 207a by surely setting the voltage output from the positive voltage generation circuit 207a at the voltage more than the ensured limit voltage Vmin.

On the other hand, in the conditions other than the H/H condition, the MPU 202 determines that Vt0>1350 V (S203). The high voltage load is small in the environments other than the H/H condition, such as the N/N condition (Vt0 is equal to 2100V, Vt1 is equal to 1500V) and the L/L condition (Vt0 is equal to 3600V, Vt1 is equal to 2500V). In other words, the electric resistance of the transfer roller 8 is large, and a high voltage needs to be output from the power supply unit 200 under the conditions. In this case, the MPU 202 does not superpose the output of the rectification circuit 205b of the negative voltage generation circuit 207b with the output of the rectification circuit 205a of the positive voltage generation circuit 207a (S204).

According to the present embodiment, if it is determined that the target transfer voltage Vt1 is greater than the ensured lower limit voltage Vmin of the piezoelectric transformer, only a positive voltage greater than the ensured lower limit voltage Vmin is applied to control the output voltage of the power supply unit 200 to the target transfer voltage Vt1. Therefore, there is no lack of high voltage output particularly under the L/L condition (15° C./10% Rh).

As described, according to the present embodiment, to obtain the target transfer voltage, the power supply unit 200 can switch and output the positive voltage and the superposed voltage (positive voltage and negative voltage) according to the load. To obtain the target transfer voltage, the power supply unit 200 can switch and output the positive voltage and the superposed voltage (positive voltage and negative voltage) according to the current value detected by the ammeter 208 (i.e. electric resistance value of the transfer roller 8).

Table 1 illustrates differences in the high voltage output range between cases when only the positive voltage is applied, when only the superposed voltage (positive voltage and negative voltage) is applied, and when the positive voltage and the superposed voltage (positive voltage and negative voltage) are switched and applied, wherein the superposed negative voltage is −1000 V.

TABLE 1

| | Positive High Voltage Output Range |
|---|---|
| Only Positive Voltage | 700 to 4000 V |
| Only Negative Voltage −1000 V Superposition | 0 to 3000 V |
| Superposition of Negative Voltage Is Switched According to Load (Present Embodiment) | 0 to 4000 V |

It can be recognized from Table 1 that the high voltage output range of the power supply unit 200 is wide when the positive voltage and the superposed voltage (positive voltage and negative voltage) are switched and applied as in the present embodiment.

This is because in the present embodiment, it is desirable that the target current I0 in the pre-operation control is 15 and that the reference voltage Vt0 obtained in the pre-operation control of the positive voltage and the superposed voltage is greater than the ensured lower limit voltage Vmin=700 V that is set in consideration of the variations in the configurations of the transfer roller 8 and the power supply unit 200.

As described, according to the present embodiment, the MPU 202 as a switching unit can switch the following two methods to supply a DC voltage of a predetermined polarity (positive polarity in the present embodiment) from the power supply unit 200 to the transfer roller 8 during image formation. A first method is a method of supplying only the output of the voltage generating circuit that generates the voltage of the predetermined polarity. A second method is a method of supplying the voltage by superposing the output of the voltage generating circuit that generates a voltage of a polarity opposite the predetermined polarity with the output of the voltage generation circuit that generates a voltage of the predetermined polarity. If the absolute value of the DC voltage of the predetermined polarity supplied to the transfer roller 8 during the image formation is greater than the absolute value of the lower limit voltage outputted by the voltage generation circuit that generates the voltage of the predetermined polarity, the voltage is supplied by the first method. On the other hand, if the absolute value of the DC voltage of the predetermined polarity supplied to the transfer roller 8 during the image formation is equal to or smaller than the absolute value of the lower limit voltage outputted by the voltage generation circuit that generates the voltage of the predetermined polarity, the voltage is supplied by the second method.

Second Embodiment

Another embodiment of the present invention will be described. Basic configurations and operations of the image forming apparatus of the present embodiment are the same as in the first embodiment. Therefore, elements with the same or equivalent functions and configurations as in the first embodiment are designated with the same reference numerals, and the detailed description will not be repeated.

In the first embodiment, the ammeter 209 is used to detect the load to predict the condition around the image forming apparatus 100, and the power supply unit 200 is controlled based on the information. Meanwhile, in the present embodiment, a condition sensor that serves as a condition detection unit that detects the temperature and/or humidity as a use condition of the image forming apparatus 100 is attached. The condition sensor detects the use condition of the image forming apparatus 100, and the power supply unit 200 is controlled based on the information. More specifically, in the present embodiment, the electric resistance value of the transfer roller 8 (or the current value flowing through the transfer roller 8) is predicted based on the detection result of the condition sensor, and the power supply unit 200 is controlled based on the result.

The condition sensor attached to the image forming apparatus 100 in the present embodiment detects the output voltage that changes according to the temperature and the humidity around the image forming apparatus 100 to detect the temperature/humidity condition around the image forming apparatus 100.

Based on the characteristics of the piezoelectric transfer or the load characteristics of the transfer roller 8 described in the first embodiment, a threshold can be set to the output voltage of the condition sensor in relation to the boundary between the condition that requires the superposition of the positive voltage with the negative voltage and the condition that does not require the superposition in the power supply unit 200. As a result, the positive voltage can be superposed with the negative voltage to output the voltage from the power supply unit 200 as in the first embodiment according to the condition around the image forming apparatus 100 detected by the condition sensor, and the same effect as in the first embodiment can be obtained.

As described, the condition sensor is used to detect the condition around the image forming apparatus 100 in the present embodiment. If it is determined that the load of the condition is large, the positive voltage is superposed with the negative voltage to output the voltage from the power supply unit 200. As a result, the voltage necessary for the transfer can be stably output from the power supply unit 200. On the other hand, if it is determined that the load of the condition is small, the negative voltage is not superposed. As a result, the output range of the power supply unit 200 is not narrowed down.

Other Embodiments

Although the present invention has been described along with the specific embodiments, the present invention is not limited to the embodiments.

For example, although the transfer voltage is a positive polarity in the description of the embodiments, the present invention can be similarly applied when the transfer voltage is a negative polarity. In that case, contrary to the embodiments, the power supply unit 200 switches the negative voltage and the superposed voltage (negative voltage and positive voltage) to output the voltage.

Although the image forming apparatus is a monochromatic image forming apparatus in the description of the embodiments, the present invention can be similarly applied to a color image forming apparatus.

Figure 9:
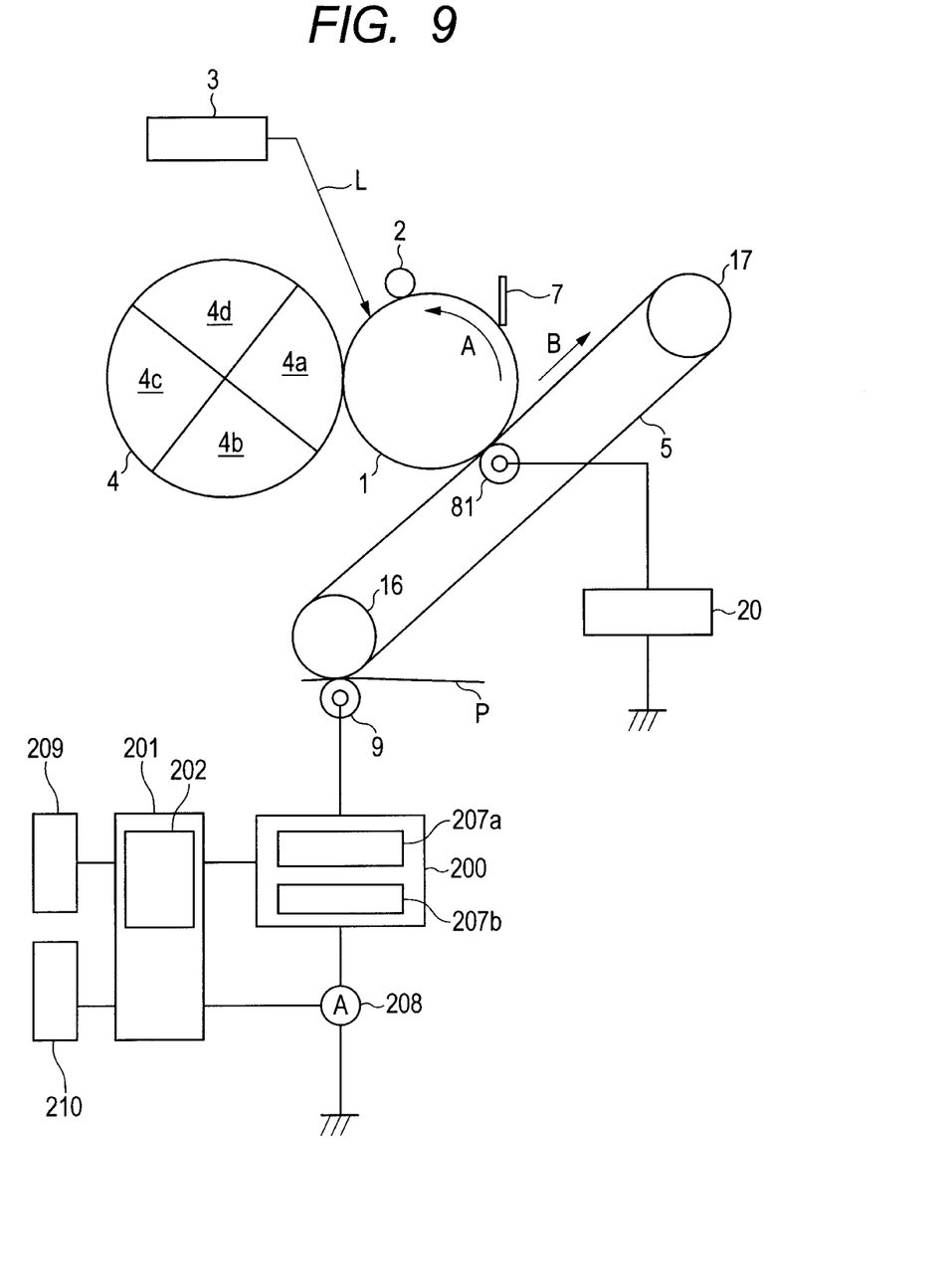
FIG. 9 is a schematic diagram illustrating a schematic configuration of the image forming apparatus including an intermediate transferring belt to which the present invention may be applied.

The image forming apparatus shown in FIG. 9 includes developing devices 4a, 4b, 4c and 4d, each of which has toners of four colors (yellow, magenta, cyan and black) and attached to a rotary drum as a developing unit 4. The developing unit 4 is rotatablely supported in the condition where the developing devices 4a, 4b, 4c and 4d are mounted to rotate and move a predetermined developing device (e.g. developing device 4a) at a developing position at which the predetermined developing device faces and contact the photosensitive drum 1.

Each color of toner is developed as a toner image on the photosensitive drum 1 in the same manner as the image forming apparatus shown in FIG. 1. The developed toner image is transferred to the intermediate transfer belt 5 as the intermediate transfer member by the primary transfer member 81. The full color toner image is formed on the intermediate transfer belt 5 by overlapping the next formed toner image with the transferred images in order. Hereinabove, the intermediate transfer belt 5 to which a toner image is transferred from the photosensitive drum is a recording medium.

The toner image overlapped on the intermediate transfer belt is transferred to a recording medium by the secondary transfer member 9. The recording medium in the secondary transfer is a recording material. Afterward, the recording material is conveyed to the fixing device as the fixing means (not-shown) as the fixing means so that the toner image is fixed on the surface of the recording material P by being heated and pressured there. And then, the recording material P is discharged outside the main body of the image forming apparatus. As shown in FIG. 9, this embodiment can be applied into the power supply unit to supply voltage to the secondary transfer member 9. Toner is secondarily transferred to the intermediate transfer belt 8 by outputting the voltage whose polarity is opposite to that of toner to the secondary transfer member 9, and then toner can be moved from the intermediate transfer belt 8 to the photosensitive drum 1 by outputting the voltage in the same polarity as that of toner to the secondary transfer member 9.

In this constituent, in the case where the positive voltage whose amount cannot be output even though the positive voltage generation circuit 207a is driven within the predetermined drive frequency area, it is possible to output the voltage by controlling to switch the positive and negative voltages so that the transfer voltage can be output from the power supply unit 200 in a stable state. Therefore, stable good image can be formed in spite of circumstance. This embodiment can be applied to the power supply unit that supplies a voltage to the primary transfer member 81 of the image forming apparatus 1 shown in FIG. 9. The recording medium is the intermediate transfer belt 8 during the primary transfer or a recording material during the secondary transfer.

Figure 10:
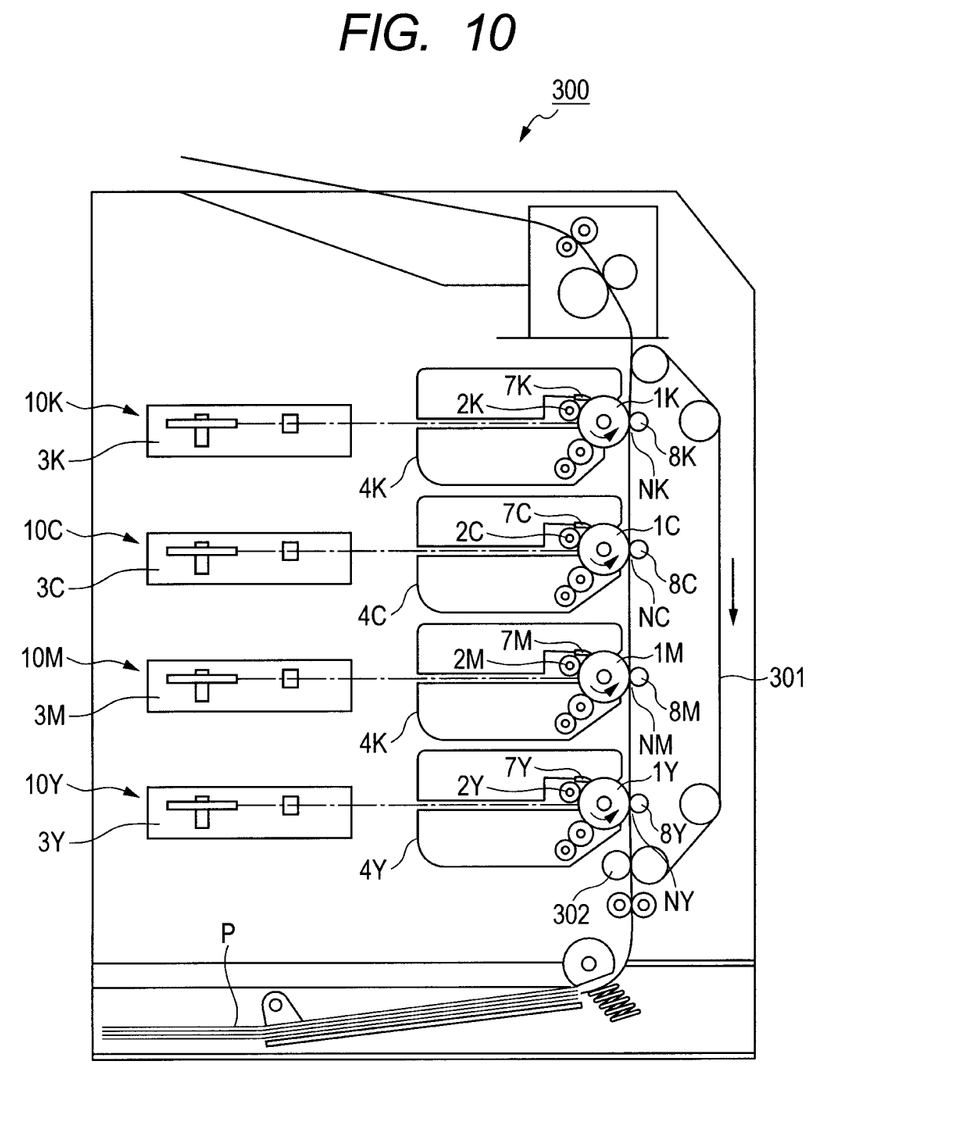
FIG. 10 is a schematic diagram illustrating a schematic configuration of an image forming apparatus including a conveyor belt to which the present invention may be applied.

To further describe this, there is, for example, a color image forming apparatus 300 in a tandem direct transfer system as illustrated in FIG. 10. The color image forming apparatus 300 includes a plurality of image forming units 10Y, 10M, 10C, and 10K that form images of yellow (Y), magenta (M), cyan (C), and black (K), respectively. In the color image forming apparatus 300 of FIG. 10, elements with the same or equivalent configurations and functions as in the image forming apparatus 100 described with reference to FIG. 1 are designated with the same reference numerals, and detailed description will not be repeated. Suffixes Y, M, C, and K provided to reference numerals in FIG. 10 denote elements provided for the colors of yellow, magenta, cyan, and black, respectively. The color image forming apparatus 300 includes a transferring member 301 as a recording material conveying member that bears and conveys the recording material P. An adsorption roller 302 as an adsorption member applies a voltage to the recording material P at a contact section between the adsorption roller 302 and the transferring member 301, and the recording material P is electrostatically adsorbed on the transferring member 301. For example, a DC voltage (adsorption voltage) of a positive polarity can be applied to the adsorption roller 302 to electrostatically adsorb the recording material P on the transferring member 301. Toner images formed on photosensitive drums 1Y, 1M, 1C, and 1K are supported by the transferring member 301 and sequentially transferred to the recording material P that passes through transfer nip portions NY, NM, NC, and NK as a result of the actions of the transfer rollers 8Y, 8M, 8C, and 8K.

The same effect can be obtained in the color image forming apparatus 300 by applying the present invention in the same way as in the embodiments in relation to the transfer rollers 8Y, 8M, 8C, and 8K. The power-fed member supplied with the voltage by the piezoelectric transformer-type power supply unit 200 is not limited to the transfer member, but may be, for example, the adsorption roller 302 as the adsorption member. In that case, the adsorption roller 302 is a power-fed member that is supplied with a DC voltage of a predetermined polarity from the power supply unit 200 during the image formation and that applies a voltage to the transferring member 301 and the recording material P as voltage-applied members.

If the conditional variation in the electric resistance value is relatively large in the adsorption roller 302, the target adsorption voltage may be smaller than the ensured lower limit voltage of the power supply unit 200, and a stable voltage may not be applied by applying only a positive voltage or a negative voltage. Therefore, the present invention can be applied to the adsorption roller 302 as in the embodiments to obtain the same effect. As in the first embodiment, whether to apply only the positive voltage or the negative voltage or to apply the superposed voltage (positive voltage and negative voltage) can be switched according to the result of the detection of the current flowing through the adsorption roller 302 by the current detection unit during the pre-operation. Alternatively, the switching may be performed according to the result of detection of the condition around the image forming apparatus 300 by the condition detection sensor as in the second embodiment.

In the present invention, the transfer voltage can be applied to the transfer material (e.g. a pad-type member, a brush type member and a corona charge member), except transfer roller 8. The power supply unit in the present invention can be applied in the case where a voltage is output to the image forming member forming an image. For example, an image forming member is the charge device 2 or the developing device 4.

Furthermore, the apparatus in the present invention includes the power supply portion and the control portion so that the present invention is applicable to the power supply system to output a voltage to the power-fed member. In particular, the apparatus in the present invention includes a power supply system including a power supply portion including a first voltage generation circuit that has a first piezoelectric transformer driven at drive frequency within the first drive frequency area to output a voltage and a second piezoelectric transformer driven at a drive frequency within the second drive frequency area to output a voltage in a polarity opposite to the voltage output from the first voltage generation circuit, a control unit that controls the power supply portion, wherein the control unit controls said power supply portion so as to output a voltage to the power fed member by overlapping a voltage output from the first voltage generation circuit by driving the first piezoelectric transformer at a drive frequency within the first drive frequency area with a voltage output from the second voltage generation circuit by driving the second piezoelectric transformer at a drive frequency within the second drive frequency area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-123355, filed May 28, 2010, which is hereby incorporated by reference herein in its entirety.

What is claimed is:

1. An image forming apparatus, comprising:
an image bearing member that bears a toner image;
a transfer member that transfers the toner image on the image bearing member to a recording medium;
a power supply unit that outputs a voltage to the transfer member, the power supply unit including:
a first voltage generation circuit that includes a piezoelectric transformer driven at a drive frequency within a predetermined frequency area to output a first voltage having a predetermined polarity, and
a second voltage generation circuit that outputs a second voltage with a polarity opposite to the predetermined polarity; and
a control unit that controls the power supply unit,
wherein the control unit controls the power supply unit to output a superposed voltage as a voltage having the predetermined polarity and corresponding to a voltage output from the piezoelectric transformer by driving the piezoelectric transformer at a driven frequency out of range of the predetermined frequency area, with the superposed voltage being a voltage in which the first voltage and the second voltage are superposed.

2. An image forming apparatus according to claim 1, wherein the control unit controls the first voltage generation circuit and the second voltage generation circuit by outputting a setting signal for setting output voltages to the first voltage generation circuit and the second voltage generation circuit.

3. An image forming apparatus according to claim 1, wherein the predetermined polarity is opposite to a normal polarity of a toner, and
wherein the opposite polarity is the same as the normal polarity of the toner.

4. An image forming apparatus according to claim 3, wherein in a case where toner adhered on the transfer member is moved to the image bearing member, the control unit controls the second voltage generation circuit to output the second voltage having the opposite polarity to the transfer member.

5. An image forming apparatus according to claim 1, wherein the image bearing member is a photosensitive member on which the exposure unit forms the electrostatic latent image, and
wherein the transfer member transfers the toner image from the photosensitive member to a recording material as the recording medium.

6. An image forming apparatus according to claim 1, wherein the image bearing member is an intermediate transferring belt that receives the toner image primarily transferred from a photosensitive member on which the exposure unit forms an electrostatic latent image, and
wherein the transfer member secondarily transfers the toner image from the intermediate transferring belt to a recording material as the recording medium.

7. An image forming apparatus according to claim 1, wherein the image bearing member is a photosensitive member on which the exposure unit forms an electrostatic latent image,
wherein the recording medium is an intermediate transferring belt that receives the toner image transferred from the photosensitive member, and
wherein the transfer member transfers the toner image from the photosensitive member to the intermediate transferring belt as the recording medium.

8. An image forming apparatus according to claim 1, further comprising a conveyance belt that conveys a recording material as the recording medium,
   wherein the image bearing member is a photosensitive member on which the exposure unit forms an electrostatic latent image, and
   wherein the transfer member transfers the toner image from the photosensitive member to the recording material conveyed by the conveyance belt.

9. An image forming apparatus according to claim 1, wherein the superposed voltage is a voltage corresponding to an output voltage from the piezoelectric transformer driven at a drive frequency area excluding a predetermined frequency area and including an unnecessary resonant frequency area.

10. An image forming apparatus according to claim 9, wherein the predetermined frequency area is set between the resonant frequency and an unnecessary resonant frequency excited in a frequency area higher than the resonant frequency,
   wherein the first voltage includes a voltage by driving the piezoelectric transformer at a drive frequency lower than a frequency area including the unnecessary resonant frequency.

11. An image forming apparatus according to claim 9, wherein an absolute value of the output voltage output by driving the piezoelectric transformer at a drive frequency out of the predetermined frequency area is less than an absolute value of a lowest value in a range of the output voltage output from the piezoelectric transformer by driving the piezoelectric transformer at a drive frequency in the predetermined frequency area.

12. An image forming apparatus according to claim 11, wherein
   the absolute value of the lowest value in the range of the output voltage is used for a reference value to determine whether or not an output voltage from the second voltage generation circuit is to be superposed, and
   when a voltage output from the power supply unit is more than the lowest value in the range of the output voltage, the control unit does not control the second voltage generation circuit without outputting a voltage.

13. An image forming apparatus according to claim 1, wherein the piezoelectric transformer of the first voltage generation circuit is driven at a first drive frequency that is within the predetermined frequency area, and
   wherein the second voltage generation circuit includes a piezoelectric transformer driven at a second drive frequency.

14. An image forming apparatus according to claim 1, wherein the second drive frequency has a fixed value.

15. An image forming apparatus according to claim 1, wherein the control unit applies the superposed voltage to the transfer member when the transfer member transfers a toner image from the image bearing member to the recording medium.

16. An image forming apparatus for forming an image on a recording medium from an electrophotographic latent image, comprising:
   an image forming member to which a voltage with a predetermined polarity is applied, and forms an electrostatic latent image during an image forming operation from which a toner image is formed and transferred to a recording medium;
   a power supply unit that outputs a voltage to the image forming member, the power supply unit including:
   a first voltage generation circuit that includes a piezoelectric transformer driven at a drive frequency within a predetermined frequency area to output a first voltage having a predetermined polarity, and
   a second voltage generation circuit that outputs a second voltage in a polarity opposite to the predetermined polarity; and
   a control unit that controls the power supply unit,
   wherein the control unit controls the power supply unit to output a superposed voltage as a voltage having the predetermined polarity and corresponding to a voltage output from the piezoelectric transformer by driving the piezoelectric transformer at a driven frequency out of range of the predetermined frequency area, with the superposed voltage being a voltage in which the first voltage and the second voltage are superposed.

17. A power supply system that outputs a voltage to a power fed member, comprising:
   a power supply portion including:
   a first voltage generation circuit that includes a piezoelectric transformer driven at a drive frequency within a predetermined frequency area to output a first voltage having a predetermined polarity, and
   a second voltage generation circuit that outputs a second voltage in a polarity opposite to the predetermined polarity; and
   a control unit that controls the power supply portion,
   wherein the control unit controls the power supply portion to output a superposed voltage as a voltage having the predetermined polarity and corresponding to a voltage output from the piezoelectric transformer by driving the piezoelectric transformer at a driven frequency out of range of the predetermined frequency area, with the superposed.

18. An image forming apparatus according to claim 17, wherein the drive frequency to drive the first voltage generation circuit has a fixed value.

19. An image forming apparatus for forming an image on a recording material in an electrophotography system, comprising:
   an image forming member;
   a power supply unit that outputs a voltage to form an image on the image forming member, the power supply unit including a voltage generation circuit that includes a piezoelectric transformer driven at a drive frequency within a predetermined frequency area to output a first voltage having a predetermined polarity, and a second voltage generation circuit that outputs a second voltage with a polarity opposite to the predetermined polarity; and
   a control unit for controlling the power supply unit,
   wherein the control unit controls the power supply unit to output a superposed voltage as a voltage having the predetermined polarity and forming an image corresponding to a voltage output from the piezoelectric transformer by driving the piezoelectric transformer at a driven frequency out of range of the predetermined frequency area, with the superposed voltage being a voltage in which the first voltage and the second voltage are superposed.

20. A power supply system comprising:
   a power supply unit including:
   a first voltage generation circuit including a piezoelectric transformer, with the first voltage generation circuit outputting a first voltage having a predetermined polarity by driving the piezoelectric transformer at a drive frequency, the drive frequency including a resonant frequency for a maximum voltage and being within a predetermined frequency area, and a second voltage generation circuit that outputs a second output voltage with a polarity opposite to the predetermined polarity; and a control unit for controlling the power supply unit, wherein the control unit controls the power supply unit to output a superposed voltage to a power-fed member as a voltage having the predetermined polarity and corresponding to a voltage output from the piezoelectric transformer by driving the piezoelectric transformer at a driven frequency out of range of the predetermined frequency area, with the superposed voltage being a voltage in which the first voltage and the second voltage are superposed.

21. An image forming apparatus, comprising:

an image bearing member that bears a toner image;

a transfer member that transfers the toner image on the image bearing member to a recording medium;

a power supply unit that outputs a transfer voltage to the transfer member, the power supply unit including;

a first voltage generation circuit that includes a piezoelectric transformer driven at a drive frequency within a predetermined frequency area to output a first voltage having a predetermined polarity, a second voltage generation circuit that outputs a second voltage with a polarity opposite to the predetermined polarity, a control unit that controls the power supply unit, wherein the control unit controls the power supply unit to output a superposed voltage to the transfer material as the transfer voltage when the transfer member transfers a toner image from the image bearing member to the recording material, with the superposed voltage being a voltage in which the first voltage and the second voltage are superposed.

* * * * *